United States Patent
Yamada et al.

[11] Patent Number: 6,162,560
[45] Date of Patent: *Dec. 19, 2000

[54] LAYER-BUILT CHEMICAL CELL DEVICE

[75] Inventors: Takashi Yamada; Taishi Tsuji; Shuichi Yanagisawa; Fumio Matsui, all of Saitama-ken, Japan

[73] Assignee: Pioneer Electronic Coporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/840,072

[22] Filed: Apr. 24, 1997

[30] Foreign Application Priority Data

Apr. 26, 1996 [JP] Japan ................................. 8-130788

[51] Int. Cl.$^7$ .............................. H01M 4/04; H01M 4/62
[52] U.S. Cl. ......................... 429/162; 429/209; 429/217; 429/233; 429/218.1
[58] Field of Search ................................... 429/209, 233, 429/218.1, 231.8, 162, 217

[56] References Cited

U.S. PATENT DOCUMENTS

| | | | |
|---|---|---|---|
| 4,960,655 | 10/1990 | Hope et al. | 429/209 X |
| 5,169,508 | 12/1992 | Suzuki et al. | 429/209 X |
| 5,723,232 | 3/1998 | Yamada et al. | 429/231.8 X |

*Primary Examiner*—John S. Maples
*Attorney, Agent, or Firm*—Arent Fox Kintner Plotkin Kahn PLLC

[57] ABSTRACT

There is provided a layer-built chemical cell device, which comprises: a positive electrode including a current collecting material and an active material layer; a negative electrode including another current collecting material and another active material layer; an electrolyte introduced in a sealed space formed by fixing together the positive electrode and negative electrode; a separator layer interposed between the positive electrode and the negative electrode. The active material layer of either the positive electrode or the negative electrode is formed by laminating a plurality of active material sub-layers containing one or more active materials, such an active material layer being depositted on a current collecting material so as to form either the positive electrode or the negative electrode.

8 Claims, 4 Drawing Sheets

LAYER-BUILT CHEMICAL CELL DEVICE

BACKGROUND OF THE INVENTION

This invention relates generally to a cell device, in particular to a chemical cell device having a positive electrode, a negative electrode, and an electrolyte, capable of generating electricity through chemical reactions, also capable of electrically charging and discharging.

A chemical cell device usually includes a positive electrode and a negative electrode each comprising an active material capable of electrically charging or discharging by collecting or producing electrons, an amount of electrolyte allowing smooth flowing of electric current and constituting another place for electrically charging and discharging by adjusting the amount of ions in the electrolyte, and a porous insulating separator provided to prevent short circuit possibly occurring between the positive electrode and the negative electrode, but not to impede ion conductivity in the electrolyte.

FIG. 3 is a cross sectional view illustrating a chemical cell device of prior art. As shown in FIG. 3, the conventional chemical cell device comprises: a positive electrode formed by depositting an active material layer 103 on a current collecting material 101, a negative electrode formed by depositting another active material layer 104 on another current collecting material 102, a porous insulating separator 105 for separating the positive electrode from the negative electrode. Referring to FIG. 3, the positive electrode, the negative electrode and the separator 105 are fixed together by means of a gasket 107 so as to form a sealed package filled with an amount of electrolyte 106. In practice, the porous insulating separator 105 is made of a porous insulator material, serving to separate the positive electrode active material layer 103 from the negative electrode active material layer 104, but not to impede ion conductivity in the electrolyte. By adjusting the amount of ions in the electrolyte, the positive electrode active material layer 103 and the negative electrode active material layer 104 may accumulate electric charges and perform discharge, allowing smooth flowing of electric charges to the positive electrode current collecting material 101 and the negative electrode current collecting material 102, thus causing the two electrodes to have different electric potential and thereby forming a desired chemical cell device.

In the layer-built chemical cell device shown in FIG. 3, the positive electrode active material layer 103 and the negative electrode active material layer 104 together provide an electric conductance, the value of which depends on the mass of these electrode active material layers 103 and 104. In order to obtain an increased conductance for a chemical cell so as to achieve a large electric current within the chemical cell during electric charging and discharging, it is required that the positive electrode active material layer 103 and the negative electrode active material layer 104 should have either large areas or great thicknesses.

Further, since charge and discharge of a chemical cell are usually effected through intercalation/deintercalation of ions between the active material layers and the electrolyte interface, there is an ion concentrate gradient from the surface of the active material layers to the inmost portions thereof. On the other hand, since it is considered that the surfaces of active material layers contribute greatly to the charging and discharging of a chemical cell, it is necessary to have a large contact area between the active material layers and the electrolyte (even if the mass of active materials remain unchanged) so as to increase the efficiency for electric charging and discharging.

In recent years, with the development of various electronic instruments using chemical cells, there has been a requirement for some improved and broadly usable chemical cell devices which are compact in size, high in capacity, and have a highly stable charging/discharging efficiency not depending upon an ambient temperature.

In order to meet the above requirement, an improved chemical cell device shown in FIG. 4 has been suggested which is constructed such that its positive electrode active material layer and its negative electrode active material layer have greatly increased areas, thus ensuring a desirably large capacity for electric charging and discharging.

However as shown in FIG. 4, when the positive electrode active material layers 103 and the negative electrode active material layers 104 have their areas increased, the chemical cell itself will become too large in size. In manufacturing the chemical cell shown in FIG. 4, the positive electrode (including the positive electrode current collecting material 101 and the positive electrode active material layers 103) and the negative electrode (including the negative electrode current collecting material 102 and the negative electrode active material layers 104) are rolled up together into a generally cylindrical form with the separators 105 interposed therebetween as shown in FIG. 4. Then, the rolled-up materials are sealed into a package filled with an electrolyte, thus forming a chemical cell device. But, in the structure of a chemical cell shown in FIG. 4, it is difficult to increase the thickness of the electrode active material layers 103 and 104 due to a restriction in the size of a chemical cell. As a result, it is impossible to ensure a sufficiently large cell capacity. In other words, if the thickness of the electrode active material layers 103 and 104 are increased in order to ensure a sufficiently large cell capacity, the chemical cell device will become too large in its overall size and this is not desirable.

Moreover, the chemical cells shown in FIGS. 3 and 4 have a common problem that the charging/discharging efficiency will depend to a great extent on an ambient temperature. For instance, the charging efficiency will become extremely bad when the ambient temperature is very low, causing unstabilized operation of the chemical cell device.

SUMMARY OF THE INVENTION

It is an object of the present invention to provide a layer-built chemical cell device which has a high capacity but is small in size, having a stabilized charging/discharging efficiency not depending upon an ambient temperature.

According to the present invention, there is provided a layer-built chemical cell device, which comprises: a positive electrode including a current collecting material and an active material layer; a negative electrode including another current collecting material and another active material layer; an electrolyte introduced in a sealed space formed by fixing together the positive electrode and negative electrode; a separator layer interposed between the positive electrode and the negative electrode. The active material layer of either the positive electrode or the negative electrode is formed by laminating a plurality of active material sub-layers containing one or more active materials, such an active material layer being depositted on a current collecting material so as to form either the positive electrode or the negative electrode.

According to an aspect of the present invention, the active material layer of either the positive electrode or the negative electrode includes a first sub-layer and one or more second sub-layers, with the first sub-layer depositted on a current collecting material, and with one or more second sub-layers laminated on the first sub-layer.

According to another aspect of the present invention, the first sub-layer is in tight contact with a current collecting material, and has a uniform thickness in a range of from one submicron to several hundred microns.

In practice, the first sub-layer is formed by coating one side of a current collecting material with a homogeneously mixed mixture containing active material(s), if necessary also containing electrically conductive material(s) and binder(s).

According to a further aspect of the present invention, one or more second sub-layers are laminated one upon another. When there are several second sub-layers, the number of the second sub-layers is variable depending upon a desired capacity of the chemical cell. Here, the or each second sub-layer is formed by a homogeneously mixed mixture containing active material(s), if necessary also containing electrically conductive material(s) and binder(s), and has a uniform thickness in a range of from one submicron to several hundred microns.

The above objects and features of the present invention will become more understood from the following description with reference to the accompanying drawings.

BRIEF DESCRIPTION OF DRAWINGS

FIG. 1a is a sectional elevation illustrating an improved chemical cell device according to an embodiment of the present invention.

FIG. 1b is an enlarged cross sectional view illustrating in detail a part of the chemical cell device shown in FIG. 1a.

DETAILED DESCRIPTION OF THE PREFERRED EMBODIMENTS

Figure 1:
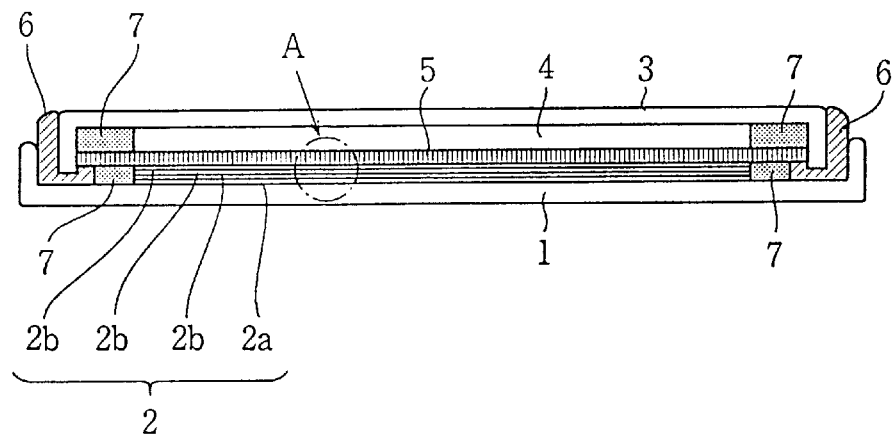
Figure 1:
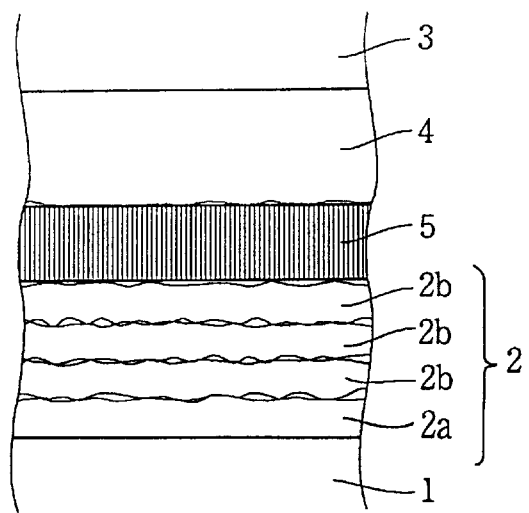

Referring to FIG. 1a, reference numeral 1 represents a positive electrode current collecting material which is selected to be electrochemically stable, have only small electric resistance but sufficient adherence for attracting active materials. In practice, the positive electrode current collecting material 1 may be made from a foil such as stainless steel foil, aluminium foil or nickel foil.

Reference numeral 2 represents a positive electrode active material layer which includes a first sub-layer 2a and one or more second sub-layers 2b.

As illustrated in FIG. 1b, one side of the first sub-layer 2a is in tight contact with the current collecting material 1, the other side of the first sub-layer 2a is laminated with one side of a second sub-layer 2b. When there are several second sub-layers 2a, they will be laminated successively one upon another. The number of the second sub-layers 2a is variable and shall be decided in accordance with what capacity a chemical cell is going to have.

In fact, the first sub-layer 2a is formed by coating one side of the current collecting material 1 with a homogeneously mixed mixture containing active material(s), electrically conductive material(s) and binder(s). Preferably, the first sub-layer 2a has a uniform thickness in a range of from one submicron to several hundred microns, and has an finely processed uneven surface on which the second sub-layer(s) 2b will be laminated.

The active material contained in the first sub-layer 2a, may be an inorganic material such as $LiCoO_2$, $LiNiO_2$, $LiMnO_2$, $V_2O_5$, $V_6O_{13}$, $TiS_2$, $MoS_2$, $NbSe_3$, $Cr_2O_5$, $Cr_3O_6$, or $LiAlCl_4.3SO_2$. On the other hand, an active material contained in the first sub-layer 2a, may also be an organic material such as polyaniline, polythiophene, polyacene, polypyrrole, or polyazulene. Further, the above inorganic and organic materials could be used singly or in a combined form.

The electrically conductive material contained in the first sub-layer 2a, may be a conductive material such as black lead, acetylene black, polypyrrole, or polyazulene. Whilst the binder may be a polyvinylidene fluoride, Tefon, polyaniline, polythiophene, polypyrrole, or polyazulene. Similarly, the above conductive materials and the binders may be used either singly or in a combined form.

The or each second sub-layer 2b is also formed by a homogeneously mixed mixture containing active material(s), electrically conductive material(s) and binder(s), having a uniform thickness in a range of from one submicron to several hundred microns, and having a certain physical strength, a certain stabilized shape, and finely processed uneven surfaces. The active material(s), electrically conductive material(s) and binder(s) used in the second sub-layer 2b are the same as those used in the first sub-layer 2a.

Referring again to FIG. 1, reference numeral 3 represents a negative electrode current collecting material which is also selected to be electrochemically stable, have only small electric resistance but sufficient adherence for attracting active materials. In practice, the negative electrode current collecting material 3 may be made from stainless steel foil, copper foil.

Reference numeral 4 represents a negative electrode active material layer which is formed by coating one side of the current collecting material 3 with a homogeneously mixed mixture containing active material(s), electrically conductive material(s) and binder(s). Conveniently, the negative electrode active material layer 4 has a uniform thickness over the entire area thereof.

The active material contained in the active material layer 4, may be lithium, lithium—aluminium alloy, natural black lead, a synthetic black lead, coke, pyrolytic carbon, carbon fiber, carbon black, polymer burned product, or mesocarbon microbeads, etc. In practice, these materials may be used either singly or in a combined form.

Further, the electrically conductive material used in active material layer 4, may be a conductive material such as black lead, acetylene black, etc. Whilst the binder may be a polyvinylidene fluoride, Tefon, etc. Similarly, the above conductive materials and the binders may be used either singly or in a combined form.

The positive electrode (including the current collecting material 1 and the active material layer 2) and the negative electrode (including the current collecting material 3 and the active material layer 4), are arranged such that a separator 5 consisting of an insulating material may be interposed therebetween so as to ensure that the two electrodes are not directly contacted with each other. A chemical cell device may thus be formed by fixing together the two electrodes with the use of a sealing member such as a gasket 6, followed by filling the sealed internal space with an electrolyte.

The separator 5 used in the embodiment of the present invention is a material having a high insulativity. If fact, the separator 5 is a porous material which is stable with respect to the electrolyte 7 and can ensure the easy passing of electrolytic ions therethrough. In practice, the separator 5 may be made from a material such as glass non-waven fabric, polypropylene non-waven fabric, polypropylene porous film, polyethylene porous film.

After the sealed internal space between the positive electrode and the negative electrode is filled with the electrolyte 7, a tiny gap formed between the first sub-layer 2a and a second sub-layer 2b as well as gaps formed between several second sub-layers 2b will also be filed with the electrolyte 7. In this way, the separator 5 will be in a condition impregnated with the electrolyte 7.

In the present invention, the electrolyte 7 used in the layer-built chemical cell, is a liquid solution formed by dissolving an amount of a solute (such as electrolytic salt) in a solvent, with the resultant solution containing ionized positive and negative ions. In detail, a solute for the electrolyte 7 may be $LiPF_6$, $LiBF_4$, $LiClO_4$, $LiAsF_6$, $LiSO_3CF_3$, or $LiN(CF_3,SO_2)_2$, etc. As a solvent for the electrolyte 7, it is allowed to use a ethylene carbonate, γ-butyrolactone, 1,2-dimethoxyethane, propylene carbonate, methylethyl carbonate, diethyl carbonate, dimethyl carbonate, dimethyl sulfoxide, sulfolane, N,N-dimethylformamide, acetonitrile, nitromethane, tetrahydrofuran, 1,3-dioxolane, 2-methoxytetrahydrofuran, diethylether, ethyl propionate, dimethoxypropane, in a single or a properly mixed form. In the chemical cell device shown in FIGS. 1a and 1b, the ions in the electrolyte 7 will move towards an interface with the active material layers due to an diffusion action caused by a concentration difference between the positive electrode active material layer 2 and the negative electrode active material layer 4, thus generating an electric potential between the positive electrode and the negative electrode.

When charging/discharging occurs between the positive electrode and the negative electrode in the chemical cell, an phenomenon of ion intercalation/deintercalation will occur with respect to the active material layers and the interface of the electrolyte 7, so that positive and negative charges will be supplied to corresponding electrodes. At this moment, since the active material layer 2 is in contact with the electrolyte 7, with one surface (finely processed) of its first sub-layer 2a in contact with the electrolyte 7, and with all the surfaces (finely processed) of its second sub-layers 2b in contact with the electrolyte 7, the overall area of interface of the electrolyte 7 for carrying out ion intercalation/deintercalation with the active material layer 2 has been greatly increased, thus increasing the conductance and hence the capacity of the chemical cell, thereby improving the charging/discharging efficiency.

Figure 2:
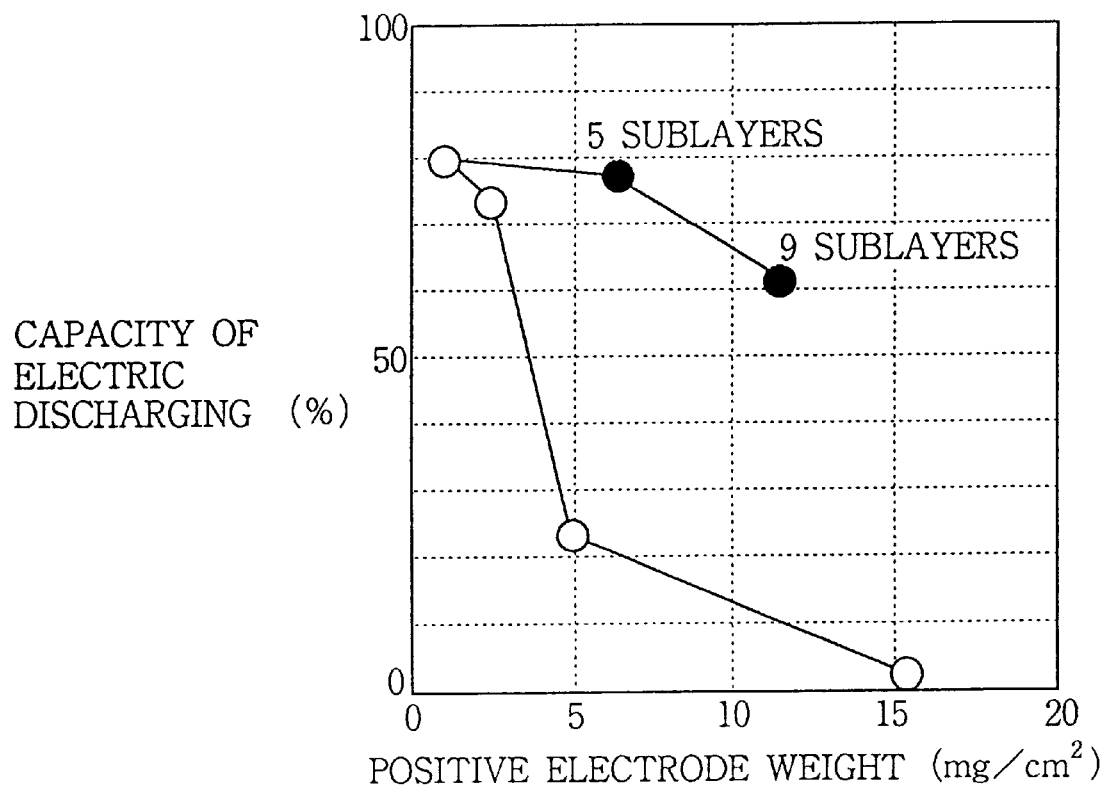
FIG. 2 is a graph indicating a relationship between positive electrode weight and charging capacity under an ambient temperature, in the case of the chemical cell device according to the present invention.
Figure 3:
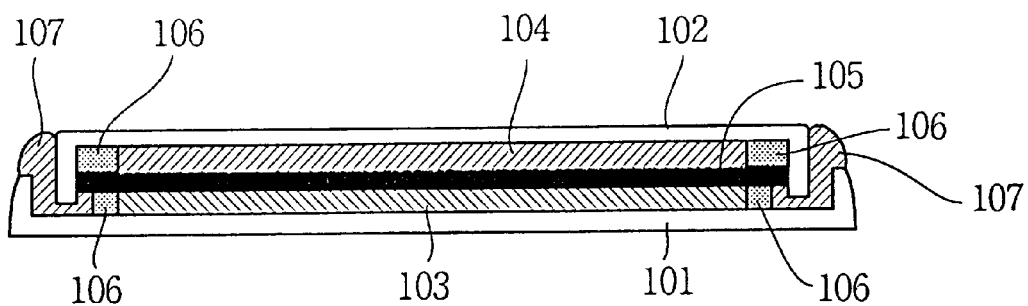
FIG. 3 is a sectional elevation illustrating a chemical cell device according to prior art.
Figure 4:
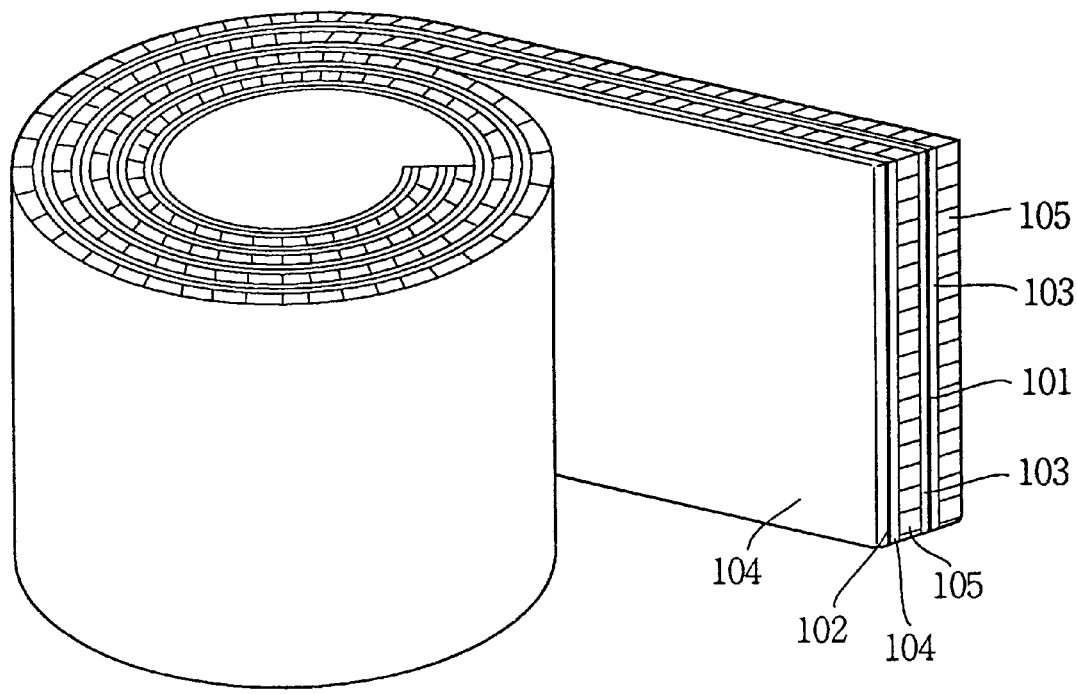
FIG. 4 is a perspective view illustrating another chemical cell device according to prior art.

FIG. 2 is a graph indicating a relationship between positive electrode weight and charging capacity under am ambient temperature of –20° C.

As shown in FIG. 2, under an ambient temperature of –20° C., when there is a change in the number of the second sub-layers 2a, the overall weight of the positive electrode (including the active material layer 2) will change, hence there will be a change in the electric charging property of the chemical cell. In the graph shown in FIG. 2, a charging capacity under room temperature is set to be 100%, thus a charging capacity under the an temperature of –20° C. is indicated to be at a certain percentage less than 100%.

In the graph shown in FIG. 2, the chemical cell of the present invention having a plurality of positive electrode active material layers is compared with a prior art chemical cell having only one positive electrode active material layer.

In the chemical cell of the present invention, the first sub-layer 2a and the second sub-layers 2b are each polyaniline, the negative electrode current collecting material is lithium, the separator 5 is a glass filter, both the positive electrode and negative electrode are held on the separator 5, with the first sub-layer 2a and the second sub-layers 2b being laminated on one another.

In the chemical cell of the present invention discussed in the graph of FIG. 2, the electrolyte 7 is obtained by first preparing a solvent containing a ethylene carbonate, γbutyrolactone, 1,2-dimethoxyethane in a ratio of 3:4:3, followed by dissolving in such prepared solvent a solute $LiBF_4$ in a manner such that $LiBF_4$ concentrate will be 1.0 (mol/liter). The electrolyte 7 thus prepared is poured into a package made of Teflon, then the first sub-layer 2a and second sub-layers 2b together with the separator 5 are introduced in the package.

A chemical cell of prior art discussed in FIG. 2 is comprised of the same material and has almost the same structure except a fact that it has only a single layer of positive electrode active material.

The chemical cell device constructed in the above-described manner is charged under an electric power of 3.9–2.8 V, 0.2 A for 6 hours (being charged under constant-voltage and constant-current). One hour after the charging, the chemical cell is caused to discharge, and 10 minutes after the discharge, the chemical cell is again electrically charged. FIG. 2 shows an electric discharging under an ambient temperature of –20° C. In such a process, the chemical cell which has been fully charged, is put into a constant temperature bath, then is caused to discharge as soon as an equilibrium temperature is reached. The discharge characteristic of the chemical cell is shown in FIG. 2.

As is understood in FIG. 2, in a conventional chemical cell having only single positive electrode active material layer, discharging capacity under a ambient temperature of –20° C. will be suddenly deteriorated with an increase in the thickness (weight) of positive electrode active material layer. In contrast, in a chemical cell of the present invention where positive electrode active material layer consists of one or more active material sub-layers (for example, 5 sub-layers or 9 sub-layers), discharging capacity under an ambient temperature of –20° C. will be deteriorated only very little even there is an increase in the thickness (weight) of positive electrode active material layer.

Although it has been described in the above embodiment that the active material layer for a positive electrode includes a first sub-layer 2a and several second sub-layers 2b, it is also possible for the negative electrode to include a first sub-layer 2a and several second sub-layer 2bs, alternatively, it is further possible for each of the positive electrode and negative electrode to include a first sub-layer 2a and several second sub-layers 2b.

Moreover, although it has been described in the above embodiment that the chemical cell is constructed as having the positive electrode, the negative electrode and the separator arranged in a flat plane, it is also possible to construct the chemical cell so as to have all the positive electrode, the negative electrode and the separator arranged in a generally cylindrical form.

While the presently preferred embodiments of the this invention have been shown and described above, it is to be understood that these disclosures are for the purpose of illustration and that various changes and modifications may be made without departing form the scope of the invention as set forth in the appended claims.

What is claimed is:

1. A layer-built chemical cell device, comprising:

a positive electrode including a current collecting material and an active material layer;

a negative electrode including another current collecting material and another active material layer;

an electrolyte introduced in a sealed space formed by fixing together the positive electrode and negative electrode;

a separator layer interposed between the positive electrode and the negative electrode;

wherein the active material layer of either the positive electrode or the negative electrode is formed by laminating a plurality of active material sub-layers containing one or more active materials, such an active material layer being deposited on a current collecting material so as to form either the positive electrode or the negative electrode, thereby forming a structure in which the plurality of active material sub-layers are interposed between the current collecting material and the separator layer;

wherein each of the plurality of the active material sub-layers is formed by at least one active material, at least one electrically conductive material, and at least one binder, said at least one active material comprising at least one of an organic compound and an inorganic compound;

wherein the number of active material sub-layers is variable depending upon a desired capacity of a chemical cell.

2. The layer-built chemical cell device according to claim 1, wherein the active material layer of either the positive electrode or the negative electrode includes a first sub-layer and one or more second sub-layers, with the first sub-layer depositted on a current collecting material, and with one or more second sub-layers laminated on the first sub-layer.

3. The layer-built chemical cell device according to claim 2, wherein the first sub-layer is in tight contact with a current collecting material, and has a uniform thickness in a range of from less than one micron to several hundred microns.

4. The layer-built chemical cell device according to claim 2, wherein the first sub-layer is formed by coating one side of a current collecting material with a homogeneously mixed mixture containing active material(s).

5. The layer-built chemical cell device according to claim 2, wherein one or more second sub-layers are laminated one upon another.

6. The layer-built chemical cell device according to claim 1, wherein the or each second sub-layer is formed by a homogeneously mixed mixture containing active material (s), and has a uniform thickness in a range of from one submicron to several hundred microns.

7. A layer-built chemical cell device as recited in claim 4, wherein said homogeneously mixed mixtures contains electrically conductive materials and binders.

8. A layer-built chemical cell device as recited in claim 6, wherein said homogeneously mixed mixtures contains electrically conductive materials and binders.

* * * * *